US010401177B2

(12) United States Patent
Morales et al.

(10) Patent No.: US 10,401,177 B2
(45) Date of Patent: Sep. 3, 2019

(54) NAVIGATIONAL AID METHOD, COMPUTER PROGRAM PRODUCT AND INERTIAL NAVIGATION SYSTEM THEREFOR

(71) Applicants: Commissariat A L'Energie Atomique Et Aux Energies Alternatives, Paris (FR); Safran, Paris (FR)

(72) Inventors: Sophie Morales, Varces (FR); Augustin Palacios Laloy, Grenoble (FR); Jean-Michel Leger, Villard Bonnot (FR); Georges Remillieux, Boulogne-Billancourt (FR); Marc Gramlich, Boulogne-Billancourt (FR); Etienne Brunstein, Boulogne-Billancourt (FR)

(73) Assignees: COMMISSARIAT A L'ENERGIE ATOMIQUE ET AUX ENERGIES ALTERNATIVES, Paris (FR); SAFRAN, Paris (FR)

( * ) Notice: Subject to any disclaimer, the term of this patent is extended or adjusted under 35 U.S.C. 154(b) by 131 days.

(21) Appl. No.: 15/840,139

(22) Filed: Dec. 13, 2017

(65) Prior Publication Data
US 2018/0164102 A1   Jun. 14, 2018

(30) Foreign Application Priority Data
Dec. 13, 2016   (FR) ...................... 16 62387

(51) Int. Cl.
*G01C 21/18*   (2006.01)
*G01P 15/08*   (2006.01)
(Continued)

(52) U.S. Cl.
CPC .............. *G01C 21/18* (2013.01); *G01C 19/56* (2013.01); *G01C 19/5776* (2013.01);
(Continued)

(58) Field of Classification Search
CPC ...... G01C 21/16; G01C 21/165; G01C 25/00; G01C 21/20; G01C 21/26; G01C 23/00;
(Continued)

(56) References Cited

U.S. PATENT DOCUMENTS

2012/0203487 A1* 8/2012 Johnson ................. G01P 21/00
                                                     702/104
2013/0138264 A1* 5/2013 Hoshizaki ............ G01C 21/165
                                                     701/1
(Continued)

FOREIGN PATENT DOCUMENTS

EP   2 685 212 A2   1/2014
WO   2016/107806 A1   7/2016

OTHER PUBLICATIONS

Jiancheng Fang et al. "Advances in Atomic Gyroscopes: A View from Inertial Navigation Applications", Sensors 2012, vol. 12, No. 12, Dec. 11, 2012.
(Continued)

*Primary Examiner* — Andre J Allen
(74) *Attorney, Agent, or Firm* — Pearne & Gordon LLP

(57) ABSTRACT

The invention relates to a navigational aid method for an inertial navigation system including at least one inertial sensor (4) having a sensitive axis (X-X), each inertial sensor (4) comprising an ASG gyroscope (8) able to deliver an ASG signal representative of a rotation about the corresponding sensitive axis (X-X), and a MEMS gyroscope (10) able to deliver a MEMS signal representative of a rotation about the corresponding sensitive axis (X-X), the method including the steps of: between a first date and a subsequent third date, calculating a path from the MEMS signals; from the third date, calculating the path from the ASG signals; estimating a bias vector introduced by the MEMS gyroscopes (10),
(Continued)

from the MEMS signals and ASG signals; at a fourth date subsequent to the third date, resetting the path.

8 Claims, 2 Drawing Sheets

(51) Int. Cl.
| | |
|---|---|
| *G01C 19/58* | (2006.01) |
| *G01C 19/56* | (2012.01) |
| *G01C 19/5776* | (2012.01) |
| *G01C 19/60* | (2006.01) |
| *G01C 21/16* | (2006.01) |
| *G01C 25/00* | (2006.01) |

(52) U.S. Cl.
CPC .............. *G01C 19/58* (2013.01); *G01C 19/60* (2013.01); *G01C 21/16* (2013.01); *G01P 15/08* (2013.01); *G01C 25/005* (2013.01)

(58) Field of Classification Search
CPC .... G01C 23/005; G01C 21/203; G01C 21/32; G01C 17/38; G01C 21/00; G01C 21/005; G01C 21/10; G01C 21/18; G01C 21/265; G01C 21/30; G01C 21/3461; G01C 21/3614; G01C 22/006; G01C 9/00; G01C 19/20; G01C 19/56; G01C 19/5719; G01C 19/5776; G01C 21/206; G01C 21/24; G01C 21/3407; G01C 21/3446; G01C 21/3453; G01C 21/3484; G01C 21/3605; G01C 21/362; G01C 21/3626; G01C 21/3629; G01C 21/3641; G01C 21/3658; G01C 21/3667; G01C 21/3673; G01C 21/3679; G01C 21/3682; G01C 21/3697; G01C 22/00; G01C 22/02; G01C 25/005; G01C 5/06; G01P 5/165; G01P 13/025; G01P 15/08; G01P 13/00; G01P 13/02; G01P 1/023; G01P 5/02; G01P 5/14; G01P 5/16; G01P 5/26
USPC ........................................................ 73/178 R
See application file for complete search history.

(56) References Cited

U.S. PATENT DOCUMENTS

| | | | |
|---|---|---|---|
| 2016/0084925 | A1 | 3/2016 | Le Prado |
| 2016/0349026 | A1* | 12/2016 | Fairfax ................. G01C 21/08 |
| 2017/0010337 | A1 | 1/2017 | Morales |
| 2018/0278847 | A1* | 9/2018 | Stec ......................... G06T 7/20 |
| 2018/0340779 | A1* | 11/2018 | Faulkner ................ G01C 21/16 |

OTHER PUBLICATIONS

Search Report issued in French Patent Application No. 1662387 dated Sep. 4, 2017.

* cited by examiner

NAVIGATIONAL AID METHOD, COMPUTER PROGRAM PRODUCT AND INERTIAL NAVIGATION SYSTEM THEREFOR

TECHNICAL FIELD

The present invention relates to a navigational aid method for an inertial navigation system fixed with respect to a solid.

The invention also has the object to provide a computer program product and an inertial navigation system.

The invention is applicable to the field of the inertial navigation by gyroscopes, in particular by atomic spin gyroscopes (ASG), such as nuclear magnetic resonance gyroscopes, also called "NMR gyroscopes", and co-magnetometers.

STATE OF PRIOR ART

The use of ASG gyroscopes as inertial sensors to make rotation measurements is known. Such ASG gyroscopes have generally a low angular random walk (ARW) and a low drift. Further, such gyroscopes are likely to be miniaturised (volume in the order of about ten cubic centimetres) and are likely to be produced at a low cost.

ASG gyroscopes are thus an interesting alternative for designing Inertial Navigation Systems (INS) which are reliable, of a small size and cheap, in particular for GPS (Global Positioning System)-free autonomous navigation applications.

However, such ASG gyroscopes are not fully satisfactory.

Indeed, the start-up time of such ASG gyroscopes, that is the duration, from the moment they are powered, at the end of which such gyroscopes are in an operational running phase, is likely to be too long for some GPS-free autonomous navigation applications.

The start-up time of an ASG gyroscope has two main limits:
 the first one is a limit of technical nature related to heating and stabilising closed loop controls on start-up;
 the second one, of a physical nature, depends on an alkaline gas/noble gas couple present in the ASG gyroscope, and corresponds to the minimum time necessary to polarise the noble gas by spin exchange with the alkaline one.

Thus, the start-up time of an ASG gyroscope is likely to reach one or more minutes.

But the implementation of an inertial navigation system requires to have available operational and high-performance inertial sensors a few seconds at most after the inertial navigation system is powered, so as to limit the duration of the initialisation phase of the inertial navigation system, also called an "alignment phase", before switching to a so-called "navigation" mode during which the inertial system is operational and delivers position, velocity and attitude information to the users.

The alignment phase is comprised, for example, of the following steps:
 starting-up the inertial navigation system (a few seconds to a few tens of seconds);
 initialising position and velocity (a few tenths of a second); and
 orienting the navigation reference frame (a few minutes).

The durations of the different steps are given below by way of indicating purposes in the case of a gyrocompass type alignment phase used for air transport type applications for which the alignment phase thus has a duration of a few minutes.

It is understood that the use of ASG type gyroscopes in an inertial navigation system causes an increase in the duration of the starting-up step, thus in the duration of the alignment phase in the inertial system, because the start-up time of the ASG gyroscopes is one or more minutes.

This increase in the duration of the phase for initialising the inertial navigation system is not desirable. Indeed, it is generally desirable that this initialisation duration is as short as possible, in particular for a GPS-free navigation application.

One purpose of the invention is thus to provide an inertial navigation system using an ASG gyroscope which is reliable, of a small size and cheap while allowing a quick starting-up.

DISCLOSURE OF THE INVENTION

To that end, one object of the invention is to provide a navigational aid method of the aforementioned type, the inertial system including at least one inertial sensor having a sensitive axis, each inertial sensor comprising an ASG gyroscope and a MEMS gyroscope integral with each other, the ASG gyroscope being able to deliver an ASG signal representative of a rotation about the corresponding sensitive axis, the MEMS gyroscope being able to deliver a MEMS signal representative of a rotation about the corresponding sensitive axis, the method including the steps of:
 calculating, between a first date and a subsequent third date, a path and, for each inertial sensor, a corresponding biased path, from the MEMS signals, assuming, for the biased path, that the inertial sensor has a predetermined unit bias;
 calculating, from the third date, the path and each biased path from the ASG signals, assuming, for the biased path, that the inertial sensor has a predetermined unit bias;
 estimating a bias vector introduced by the MEMS gyroscopes, from the MEMS signals and ASG signals;
 resetting, at a fourth date subsequent to the third date, the path as a function of each biased path, the unit biases and the bias vector estimated, to obtain a nominal path which is not affected by the bias of the MEMS gyroscopes.

Indeed, MEMS gyroscopes have a short start-up time, which makes the inertial system quickly operational. Merging the signals collected from the MEMS gyroscopes and ASG gyroscopes contribute to compensate for errors related to the biases introduced by MEMS gyroscopes.

The nominal path thus obtained is no longer affected by the bias of the MEMS gyroscopes.

Further, unlike other types of instruments, MEMS and ASG gyroscopes are able to provide a measurement continuously, which makes it possible to use them in such an inertial system.

The navigational aid method subject matter of the invention is thus reliable and allows a quick starting-up.

According to other advantageous aspects of the invention, the inertial navigation system includes one or more of the following characteristics, taken alone or according to any technically possible combinations:
 for each MEMS gyrometer, the corresponding component of the bias vector is equal to the average, between a second date and the fourth date, of the difference between an angular velocity from the corresponding MEMS signal and an angular velocity from the corresponding ASG signal, the second date being included between the first date and the third date;

the nominal trajectory is obtained by subtracting a reset from the path, the reset being a vectorial corrective term calculated according to:

$$\delta Xn = b_{0x}\frac{\partial \overline{Xn}}{\partial D0x} + b_{0y}\frac{\partial \overline{Xn}}{\partial D0y} + b_{0z}\frac{\partial \overline{Xn}}{\partial D0z}$$

where $\delta Xn$ is the reset;
$b_{0i}$ is the i-th component of the bias vector; and
the quantity $$\frac{\partial \overline{Xn}}{\partial D0i}$$

is calculated according to:

$$\frac{\partial \overline{Xn}}{\partial D0i} = \frac{XnDi(t_{rec}) - Xn(t_{rec})}{D0i}$$

where $XnDi(t_{rec})$ is the i-th biased path taken at the fourth date; and
D0i is the predetermined unit bias associated with the component i;
the method comprises an overlap step, the overlap step including:
between a second date and the third date, the second date being included between the first date and the third date, a first phase for calculating the path and each biased path from the MEMS signal;
at the third date, a switching for calculating the path and each biased path from a corresponding angle increment, the angle increment being obtained, for each sensitive axis, by the relationship:

$d\theta_{com} = \theta_{ASG}(t_{com}) - \theta_{MEMS}(t_{com} - T_e) - \Delta\theta$ where $d\theta_{com}$ is the angle increment;
$\theta_{ASG}(t_{com})$ is a quantity equal to the cumulation of rotation angle increments about the sensitive axis between the second date and the third date, calculated from the ASG signal upon switching;
$\theta_{MEMS}(t_{com} - T_e)$ is a quantity equal to the cumulation of rotation angle increments about the sensitive axis between the second date and a duration $T_e$ before the third date, which are calculated from the MEMS signal;
each increment being equal to an integral, between two successive instants, of the angular velocity of rotation about a sensitive axis from the corresponding MEMS or ASG signal,
$\Delta\theta$ is a predetermined angular corrective term; and
$T_e$ is a predetermined duration;
between the third date and the fourth date, a second phase for calculating the trajectory and each biased trajectory from the ASG signal;
the angular correction is equal to an average, between the second date and the third date, of the values taken over time by the quantity ($\theta_{ASG} - \theta_{MEMS}$),
where $\theta_{ASG}$ is a quantity equal, at a given instant, to the cumulation from the second date up to said given instant, of the rotation angle increments about the sensitive axis which are obtained from the ASG signal, for the inertial sensor 4 considered, and
$\theta_{MEMS}$ is a quantity equal, at a given instant, to the cumulation, from the second date up to said given instant, of the rotation angle increments about the sensitive axis, which are obtained from the MEMS signal;
the method includes, from the fourth date, calculating the nominal path only from the ASG signals.

Further, one object of the invention is to provide a computer program product comprising program code instructions which, when executed by a computer, implement the method as defined above.

Further, one object of the invention is to provide an inertial navigation system, fixed with respect to a solid, the inertial system including at least one inertial sensor having a sensitive axis, each inertial sensor comprising an ASG gyroscope and a MEMS gyroscope integral with each other, the ASG gyroscope being able to deliver an ASG signal representative of a rotation about the corresponding sensitive axis, the MEMS gyroscope being able to deliver a MEMS signal representative of a rotation about the corresponding sensitive axis, the inertial system further comprising a calculator configured to implement the navigational aid method as defined above.

BRIEF DESCRIPTION OF THE DRAWINGS

The invention will be better understood upon reading the description that follows, given only by way of non-limiting example and made in reference to the appended drawings in which.

DETAILED DISCLOSURE OF PARTICULAR EMBODIMENTS

In what follows, vectorial quantities are noted in bold.

Figure 1:
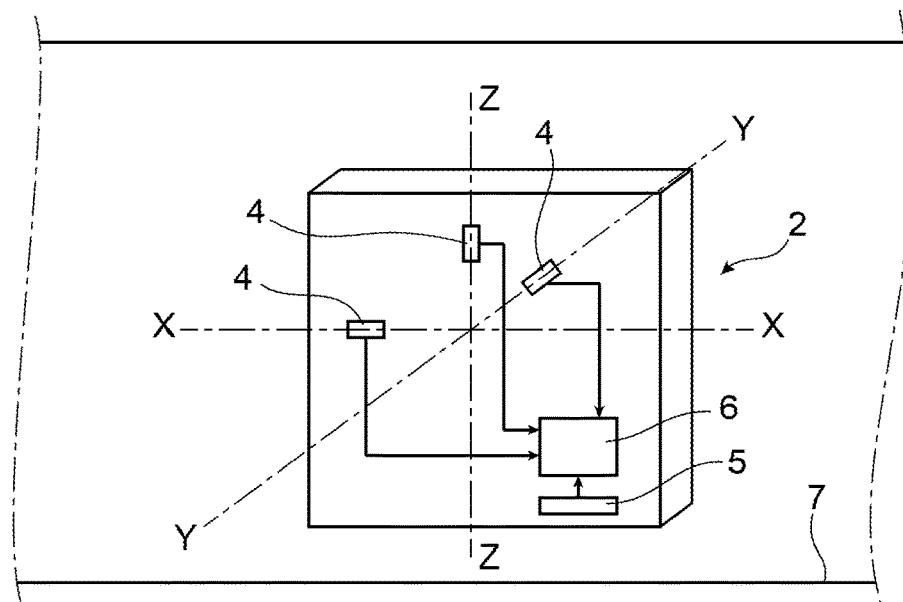
FIG. 1 is a schematic representation of an inertial system according to the invention.
Figure 2:
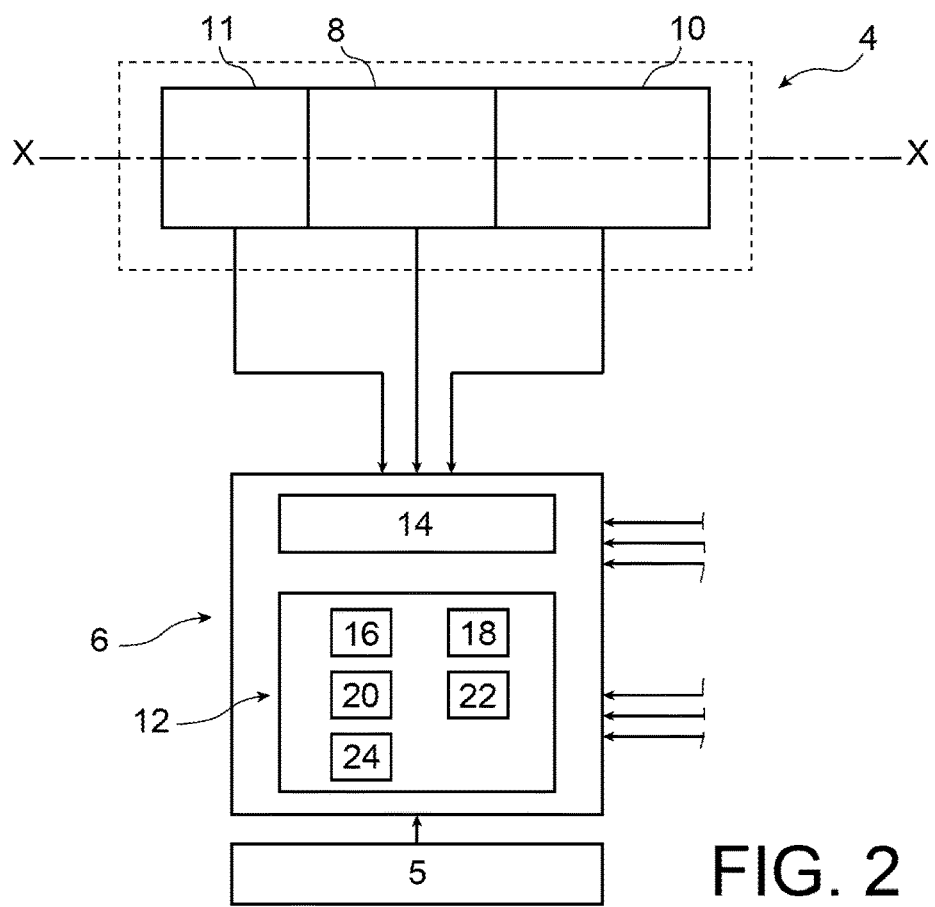
FIG. 2 is a schematic representation of an inertial sensor of the inertial system of FIG. 1.

An inertial navigation system 2 according to the invention is represented in FIG. 1.

The inertial system 2 includes at least one inertial sensor 4, a clock 5 and a calculator 6.

Each inertial sensor 4 is able to detect a displacement, such as a rotation about a corresponding predetermined axis, also called a "sensitive axis", or even a translation, or any combination of rotations and translations.

For example, as illustrated in FIG. 1, the inertial system 2 includes three inertial sensors 4 having respectively a sensitive axis X-X, Y-Y and Z-Z. The inertial sensors 4 are fixed with respect to each other.

Advantageously, the sensitive axes X-X, Y-Y and Z-Z of each of the inertial sensors 4 are not parallel by pairs, for example orthogonal to each other.

The clock 5 is configured to deliver a clock signal representative of the passage of time.

The calculator 6 is configured to calculate the path over time Xn(t) of a solid 7 fixed with respect to the inertial system 2. Such a solid 7 is, for example, an aircraft taking the inertial system 2 on board.

In particular, the calculator 6 is configured to calculate the path Xn(t) of the solid 7 as a function of the clock signal and signals from the inertial sensors 4 and which are subsequently described.

By "path", it is intended, for the purpose of the present invention, the datum of the position, velocity and attitude of the solid 7 in a reference axis system related to Earth.

By "attitude", it is intended, for the purposes of the present invention, the datum of roll, pitch, and heading angles formed by predetermined axes of the solid 7 and the axes of the predetermined reference axis system. In this case, the path Xn(t) of the solid 7 is a nine-component vector, that is three position components, three velocity components and three attitude angles.

Each point of the path Xn(t) is associated with a date, also called an "instant", given by the clock signal from the clock 5.

Each inertial sensor 4 includes an ASG gyroscope 8, a MEMS gyroscope 10 and an accelerometer 11.

The ASG gyroscope 8 has a sensitive axis defining the sensitive axis of the inertial sensor 4.

The ASG gyroscope 8 is able to deliver an ASG signal representative of a rotation of the inertial sensor 4 about the corresponding sensitive axis.

The ASG gyroscope 8 is, for example, an NMR gyroscope or a co-magnetometer, which are conventionally known.

The ASG gyroscope 8 is associated with a start-up time $T_d$, also called "start-up duration". From the powering, also called "starting-up", of the ASG gyroscope 8, the ASG gyroscope 8 is only operational at the end of a duration equal to the start-up duration $T_d$.

For example, the start-up duration $T_d$ is typically in the order of one minute.

A gyroscope is said "operational", for the purposes of the present invention, when it is found in a nominal running mode.

The MEMS ("microelectromechanical systems") gyroscope 10 is a conventionally known electromechanical microsystem gyroscope.

The MEMS gyroscope 10 is integral with the ASG gyroscope 8.

The MEMS gyroscope 10 has a sensitive axis identical to the sensitive axis of the ASG gyroscope 8.

The MEMS gyroscope 10 is able to deliver a MEMS signal representative of a rotation of the inertial sensor 4 about to the corresponding sensitive axis.

The MEMS gyroscope 10 is operational at most a few seconds after being started-up.

For each inertial sensor 4, the corresponding MEMS gyroscope 10 is supposed to have an average bias $b_0$ over the start-up duration $T_d$. Such a bias is homogeneous at an angular velocity. The drift in the value of the bias $b_0$ over the start-up duration $T_d$ is supposed to be negligible relative to the value of the bias $b_0$ and compatible with the needs of the inertial navigation system 2.

The values of the biases for all three sensitive axes X-X, Y-Y, Z-Z form a three-component bias vector $B_0$. The three components of the bias vector $B_0$, noted $b_{0x}$, $b_{0y}$, $b_{0z}$, are respectively associated with the sensitive axes X-X, Y-Y and Z-Z.

Further, for each inertial sensor 4, the corresponding ASG gyroscope 8 is supposed to have, at the end of the start-up duration $T_d$, a bias the value and the drift of which are negligible relative to the value of the bias $b_0$ of the associated MEMS gyroscope 10.

The accelerometer 11 has a sensitive axis, preferably identical to the sensitive axis of the corresponding inertial sensor 4.

The accelerometer 11 is able to deliver an acceleration signal representative of the non-gravitational acceleration, also called "specific force", of the inertial sensor 4 along the corresponding sensitive axis.

Preferably, the accelerometer 11 is integral with the ASG gyroscope 8 and the MEMS gyroscope 10.

The accelerometer 11 is operational at most a few seconds after being powered.

The calculator 6 is connected to the ASG gyroscope 8 to receive the ASG signal. The calculator 6 is also connected to the MEMS gyroscope 10 to receive the MEMS signal. The calculator 6 is, further, connected to the accelerometer 11 to receive the acceleration signal. The calculator 6 is also connected to the clock 5 to receive the clock signal.

The calculator 6 includes a memory 12 and a processor 14.

The memory 12 includes a configuration location 16 and a record location 18.

The memory 12 is further configured to store a navigation software 20, a calculation software 22 and a correction software 24.

The configuration location 16 is configured to store the start-up duration $T_d$, an overlap duration $T_{rec}$, and a switching duration $T_{com}$.

For example, the switching duration $T_{com}$ is typically in the order of a few seconds. The switching duration $T_{com}$ is lower than or equal to the overlap duration $T_{rec}$.

The configuration location 16 is also configured to store, for each MEMS gyroscope 10, a predetermined arbitrary constant unit bias. For each sensitive axis X-X, Y-Y and Z-Z, the unit biases are respectively noted D0x, D0y and D0z. The value of the unit biases D0x, D0y, D0z is, preferably lower than a few tenths of a degree per hour (°/h), for example D0x=D0y=D0z=0.01°/h. Such a value minimises linearisation errors, as will be subsequently described.

The record location 18 is configured to store the bias vector $B_0$.

The record location 18 is also configured to store the path Xn(t) of the solid 7.

The record location 18 is further configured to store three biased paths XnDi(t) (i being x, y or z) of the solid 7 and an offset δXn, which are subsequently defined.

Each biased path XnDi(t) is a path calculated assuming that the inertial system 2 is, for the axis i (i being x, y or z), affected by the corresponding unit bias D0i.

Figure 3:
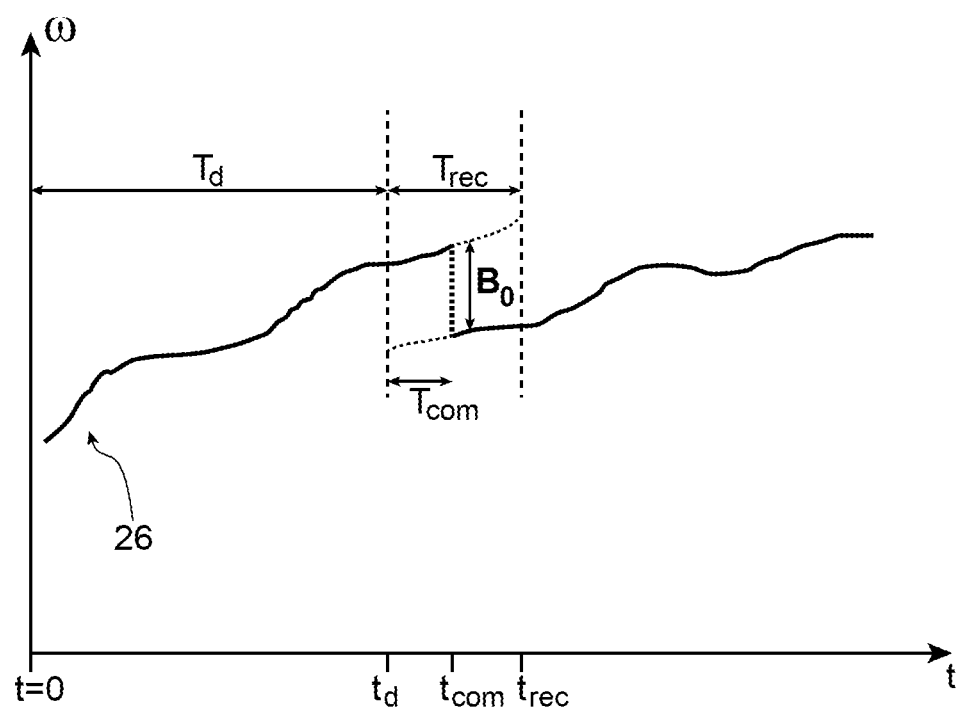
FIG. 3 is a graph representing the change over time of an angular velocity measured by the inertial system of FIG. 1.

The navigation software 20 is configured to calculate, for each sensitive axis X-X, Y-Y, Z-Z, the change over time of the angular velocity w about the sensitive axis, illustrated by the curve 26 in FIG. 3.

The navigation software 20 is also configured to calculate over time, and for each sensitive axis X-X, Y-Y, Z-Z, the value of a corresponding angle increment dθ. For each of the sensitive axes X-X, Y-Y, Z-Z, in the case of a discretisation of the numerical calculations enabling Xn(t) to be calculated, the increment dθ is equal to the integral, between two successive instants, of the angular velocity ω from the corresponding MEMS or ASG signal. The increment is noted $dθ_{MEMS}$, respectively $dθ_{ASG}$, if it is obtained from the MEMS signal, respectively from the ASG signal.

The navigation software 20 is also configured to calculate the path over time Xn(t) of the solid 7, from the MEMS signal and/or the ASG signal and from the acceleration signal provided by each inertial sensor 4. In particular, the navigation software 20 is configured to calculate the path Xn(t) from the increments $dθ_{MEMS}$ and/or $dθ_{ASG}$, and of each acceleration signal.

Further, the navigation software 20 is configured to calculate the three biased paths XnDi(t) over time of the solid 7 from the unit biases D0x, D0y, D0z stored in the configuration location 16, and of the MEMS signal and/or of the ASG signal, and the acceleration signal provided by each inertial sensor 4. In particular, the navigation software 20 is configured to calculate the biased paths XnDi(t) from the unit biases D0x, D0y, D0z, of the increments $d\theta_{MEMS}$, $d\theta_{ASG}$, and of each acceleration signal.

The calculation software 22 is configured to calculate the bias vector $B_0$.

The calculation software 22 is also configured to calculate an angular correction $\Delta\theta$ between the MEMS signal and the ASG signal, which correction is subsequently defined.

The correction software 24 is configured to calculate the offset $\delta Xn$.

The processor 14 is adapted to execute each among the navigation software 20, the calculation software 22 and the correction software 24 stored in the memory 12 of the calculator 6.

The operation of the inertial navigation system 2 will now be described in reference to FIG. 3.

During a start-up step, the ASG gyroscope 8, the MEMS gyroscope 10 and the accelerometer 11 of each inertial sensor 4 of the inertial system 2 are started-up, that is powered, at an instant t=0 corresponding to the beginning of the start-up step.

The start-up step has a duration equal to the start-up duration $T_d$ stored in the configuration location 16. During the start-up step, the ASG gyroscope 8 is not operational.

During the start-up step, the navigation software 20 calculates the path over time Xn(t) of the solid 7 from the MEMS signal and the acceleration signal from each inertial sensor 4, that is the navigation software 20 calculates the path Xn(t) as a function of the increments $d\theta_{MEMS}$ and of each acceleration signal. Such a calculation is conventionally known.

Further, the navigation software 20 calculates the biased paths over time XnDi(t) of the solid 7.

The calculation of the biased paths XnDi(t) differs from the calculation of the path Xn(t) only in that the increments $d\theta_{MEMS}$ obtained from the MEMS signal are raised by an angle increment $\delta\theta$.

For example, in the case where the MEMS signal and ASG signal are each discrete signals obtained by sampling, at a sampling frequency $f_e$, of a corresponding continuous signal, the angle increment $\delta\theta$ is equal, for each sensitive axis X-X, Y-Y, Z-Z, to the result of the division of the corresponding unit bias D0x, D0y, D0z by the sampling frequency $f_e$, expressed in the suitable unit.

During the start-up step, the navigation software 20 writes, in the record location 18, the path Xn(t) and the biased paths XnDi(t) calculated.

The step following the start-up step is an overlap step.

During the overlap step, for each inertial sensor 4, each of both ASG 8 and MEMS 10 gyroscopes is an operational running phase, both ASG 8 and MEMS 10 gyroscopes being used together.

During the overlap step, the ASG and MEMS signals are compared to each other in order to switch from the MEMS gyroscope 10 to the ASG gyroscope 8.

By "switching", it is intended, for the purposes of the present invention, switching from one calculation of the path Xn(t) from the MEMS signal to a calculation of the path Xn(t) from the ASG signal.

Further, during the overlap step, both ASG and MEMS signals are also used to estimate the bias vector $B_0$ associated with each MEMS gyroscope 10. The beginning of the overlap step corresponds to an instant $t=T_d$, also noted $t_d$.

The overlap step has a duration equal to the overlap duration $T_{rec}$ stored in the configuration location 16, such that the overlap step is completed at the instant $t=T_d+T_{rec}$, also noted $t_{rec}$.

The overlap step is comprised of a first phase, called a switching phase, and a second phase.

The first phase has a duration equal to the switching duration $T_{com}$, stored in the configuration location 16. The first phase starts as soon as the overlap step begins, at the instant $t_d$, and is completed at the instant $t=T_d+T_{com}$, also noted $t_{com}$.

The switching occurs at the instant $t_{com}$.

The second phase begins at the instant $t_{com}$, and is completed at the end of the overlap step, that is at the instant $t_{rec}$.

During the overlap step, the calculation software 22 calculates, for the sensitive axis i of each inertial sensor 4, a corresponding bias $b_{0i}$, equal to the average, preferably on the entire overlap step, of the difference between the angular velocity from the MEMS signal and the angular velocity from the corresponding ASG gyroscope 8. Since the bias of the ASG gyroscope 8 is assumed to be low with respect to the bias of the MEMS gyroscope, the bias deviation between both MEMS 10 and ASG 8 gyroscopes is ascribed to the MEMS gyroscope 10.

Then, for each component of the bias vector $B_0$ associated with a sensitive axis X-X, Y-Y, Z-Z, the calculation software 22 writes, in the record location 18, the bias $b_{0i}$ (i being x, y or z), calculated for the MEMS gyroscope 10 of the corresponding inertial sensor 4. The duration $T_{rec}$ is chosen to allow an ARW white noise filtering of both MEMS 10 and ASG 8 gyroscopes in order to estimate the bias vector $B_0$ at best.

The estimation accuracy of each component of the bias vector $B_0$ is given by the formula (1):

$$\sigma(\widehat{\delta b_0}) = \sqrt{\frac{qARWm^2 + qARWr^2}{T_{rec}}} \qquad (1)$$

where $\sigma(\widehat{\delta b_0})$ is the standard deviation of the estimation error of the bias of the MEMS gyroscope 10 (in °/h);

qARWm is the drift white noise power spectral density of the MEMS gyroscope 10 (in °/√h); and qARWr is the drift white noise power spectral density of the ASG gyroscope 8 (in °/√h).

For example, with a power spectral density qARWm of the drift white noise of the MEMS gyroscope 10 being $10^{-3}$°/√h, a power spectral density qARWr of the drift white noise of the ASG gyroscope 8 being $10^{-3}$°/√h, an overlap duration $T_{rec}$ being 60 sec, the standard deviation of the error on the estimation $\sigma(\widehat{\delta b_0})$ of the bias of the MEMS gyroscope 10 is 0.011°/h.

Further, during the overlap step, the navigation software 20 calculates the path Xn(t) and the biased paths XnDi(t) of the solid 7.

More precisely, during the first phase, the navigation software 20 calculates the path Xn(t) of the solid 7 from the MEMS signal and the acceleration signal from each inertial sensor 4. In particular, the navigation software 20 calculates the path Xn(t) from the angle increment $d\theta_{MEMS}$ from each MEMS signal, and the acceleration signal from each inertial sensor 4.

Further, during the first phase, the navigation software 20 calculates the biased paths XnDi(t) of the solid 7 from the MEMS signal and the acceleration signal from each inertial sensor 4, and unit biases. More precisely, the navigation software 20 calculates the biased paths XnDi(t) from the angle increment $d\theta_{MEMS}$ from each MEMS signal, of the angle increment δθ determined from the unit biases D0i and from each acceleration signal.

Further, during the first phase, the calculation software 22 calculates, for each inertial sensor 4, a corresponding angular correction Δθ. The angular correction Δθ is equal to the average, over the switching duration $T_{com}$, of the values taken over time by the quantity $(\theta_{ASG}-\theta_{MEMS})$, where $\theta_{MEMS}$ is a quantity calculated from the MEMS signal and equal, at a given instant, to the cumulation, from the instant $t_d$ to said given instant, of the increments $d\theta_{MEMS}$, and where $\theta_{ASG}$ is a quantity calculated from the ASG signal and equal, at a given instant, to the cumulation, from the instant $t_d$ to said given instant, of the increments $d\theta_{ASG}$, for the inertial sensor 4 considered. The angular correction Δθ is intended to correct the error induced, upon switching, by the angular white noise on the measurements from the ASG and MEMS gyroscopes.

Then, upon switching, the calculation software 22 transmits to the navigation software 20 the angular correction Δθ obtained at the end of the first phase, so as to ensure continuity between the measurements based on the MEMS gyroscopes 10 and the measurements based on the ASG gyroscopes 8.

Further, the navigation software 20 calculates the point of the path $Xn(t_{com})$ of the solid 7, at the instant $t_{com}$, from an angle increment $d\theta_{com}$, and of each acceleration signal.

For a given sensitive axis, the corresponding angle increment $d\theta_{com}$ is obtained by the relationship (2):

$$d\theta_{com}=\theta_{ASG}(t_{com})-\theta_{MEMS}(t_{com}-T_e)-\Delta\theta \quad (2)$$

where $\theta_{ASG}(t_{com})$ is the value taken by $\theta_{ASG}$ at the instant $t_{com}$;

$\theta_{MEMS}(t_{com}-T_e)$ is the value taken by $\theta_{MEMS}$ one sampling period before the instant $t_{com}$; and $T_e$ is the sampling period, equal to the inverse of the sampling frequency.

Further, upon switching, the correction software 24 rewrites, in the configuration location 16, the value of each unit drift D0x, D0y, D0z to ascribe it a zero value. This is due to the fact that, from switching, the calculation of the path Xn(t) and the biased paths XnDi(t) is made from the ASG signals, the drift of the ASG gyroscopes 8 being assumed to be negligible relative to the drift of the MEMS gyroscopes 10.

For each sensitive axis, the navigation software 20 calculates the point of the biased path $XnD(t_{com})$ of the solid 7, at the instant $t_{com}$, from the angle increment $d\theta_{com}$ and from each acceleration signal, the value of each unit drift D0x, D0y, D0z having been set to zero upon switching.

Switching to a calculation of the path Xn(t) (and of the biased paths XnDi(t)) from the ASG signal instead of the MEMS signal is possible because the error related to switching mainly depends on the angular white noise on the measurements from the ASG 8 and MEMS 10 gyroscopes.

The standard deviation of the angular error made and related to switching is given by the relationship (3):

$$\sigma(\theta)=\sqrt{\frac{qBAm^2+qBAr^2}{T_{com}}} \quad (3)$$

where qBAm is the angular white noise power spectral density of the MEMS gyroscope 10 (in $\mu rad/\sqrt{Hz}$);

qBAr is the angular white noise power spectral density of the ASG gyroscope 8 (in $\mu rad/\sqrt{Hz}$);

σ(θ) is the standard deviation of the angular error due to switching.

For example, for a power spectral density of the angular white noise being 1 $\mu rad/\sqrt{Hz}$ for each of both ASG 8 and MEMS 10 gyroscopes, and a switching duration $T_{com}$ equal to 5 s, the standard deviation of the angular error σ(θ) related to switching is 0.63 μrad.

Then, during the second phase, the navigation software 20 calculates the path Xn(t) of the solid 7 only from the ASG signal and the acceleration signal from each inertial sensor 4.

The navigation software 20 also calculates the biased paths XnDi(t) of the solid 7 only from the ASG signal and the acceleration signal from each inertial sensor 4, the value of each unit drift D0x, D0y, D0z having been set to zero upon switching.

During the overlap step, the navigation software 20 writes, in the record location 18, the path Xn(t) and the biased paths XnDi(t) calculated.

In summary, during the first phase, the navigation software 20 uses the angle increments $d\theta_{MEMS}$ from the MEMS signal; at the switching instant, the navigation software 20 uses the increment $d\theta_{com}$; then, during the second phase, the navigation software 20 uses the increments $d\theta_{ASG}$ from the ASG signal.

The step following the overlap step is a correction step intended to correct the angular errors introduced by the bias of the MEMS gyroscopes during the use of the MEMS gyroscopes during a start-up step and the first phase of the overlap step.

The correction step occurs at the date $t_{rec}$.

During the correction step, the navigation software 20 calculates the path Xn(t) of the solid 7 from the ASG signal and the acceleration signal from each inertial sensor 4.

Further, during the correction step, the correction software 24 offsets the path Xn(t) of the solid 7 from the value δXn at the instant $t_{rec}$. The path thus offset is the path which would have been calculated by the navigation software 20 if the ASG gyroscopes 8 had been operational as soon as the inertial system 2 had started up.

As previously described, the correction software 24 calculates, during the start-up step and the overlap step, the three biased paths XnDi(t) (with i taking the value x, y or z) corresponding to the output data of the navigation algorithm when the data of the MEMS 10 are biased by a constant unit bias $D0_i$ (with i taking the value x, y or z). For example, XnDx(t) is the path calculated by the navigation algorithm of the inertial navigation system when the nominal measurements of the inertial sensor 4 with the sensitive axis X-X are offset by a further unit bias $D0_x$. This bias $D0_i$ (stored in the configuration location 16) takes two values depending on the instant considered:

from t=0 to $t_{com}$, the value of this unit bias is set to a value which has to be low to minimise linearisation errors. Typically, $D0_x=D0_y=D0_z=0.01°/h$;

then, from $t_{com}$ to $t_{rec}$, the biases are set to 0 because switching results in continuing navigation using data from the ASG gyroscopes considered as bias-free.

At the beginning of the correction step, the correction software 24 calculates partial derivatives $$\frac{\partial Xn}{\partial Di}$$

(with i taking the value x, y or z). Each partial derivative $$\frac{\partial Xn}{\partial Di}$$

(with i taking the value x, y or z) is the derivative of the path Xn(t) with respect to the unit drift $D0_i$ of the corresponding MEMS gyroscope 10, calculated with the following relationship (4):

$$\frac{\partial \bar{Xn}}{\partial Di} = \frac{XnDi(t_{rec}) - Xn(t_{rec})}{D0_i} \quad (4)$$

where $D0_i$ is the unit bias associated with the axis i.

The correction software 24 then calculates the vectorial offset δXn from the estimate of the partial derivatives $$\frac{\partial \bar{Xn}}{\partial Di}$$

and from the estimate of the bias vector $B_0$ of the MEMS gyroscope 10 according to the formula (5):

$$\delta Xn = b_{0x}\frac{\partial \bar{Xn}}{\partial D0_x} + b_{0y}\frac{\partial \bar{Xn}}{\partial DO_y} + b_{0z}\frac{\partial \bar{Xn}}{\partial D0_z} \quad (5)$$

$b_{0i}$ being the component i of the bias vector $B_0$.

δXn is thus a nine-dimension vector.

Then, the correction software 24 resets the path Xn(t) at the instant $t_{rec}$ by subtracting the correction term δXn from the path Xn(t) according to the relationship (6):

$$Xn(\text{after resetting}) = Xn(\text{before resetting}) - \delta Xn \quad (6).$$

In this way, the initial error due to the use of the MEMS gyroscopes 10 is corrected.

The path Xn(t) reset is called a "nominal path".

Once the path Xn(t) is reset, the calculation of the biased paths is interrupted, because useless. In the following, the navigation software 20 continues the calculation of the path Xn(t) of the solid 7 from the angle increment only from the ASG signal and the acceleration signal from each inertial sensor 4.

The bias correction method of the MEMS gyroscope 10 set forth above results in linearising Xn with respect to the three unit biases D0x, D0y and D0z. This imposes a bias value $b_{0i}$ (with i taking the value x, y or z) which does not exceed a few tenths of a degree per hour, to avoid too high a navigation error resulting into strong non-linearities making the above correction formula 5 invalid.

The path Xn(t) calculated by the navigation software 20 at the end of switching is affected by the bias of the MEMS gyroscopes 10, which introduces navigation errors in calculating the path during the use of the MEMS gyroscopes 10 from starting-up of the inertial system (t=0) until the end of the first phase ($t_{com}$), these errors being propagated until the end of the second phase of the overlap step ($t_{rec}$). By virtue of such an inertial system 2, such navigation errors are compensated for and a quick start-up of the inertial system is possible.

The method for correcting the errors induced by the bias in the MEMS gyroscopes 10 which has been described above has the advantage, unlike a method which would consist in recalculating the entire path from the beginning with measurements from the MEMS gyroscopes corrected by $B_0$, of being simple to implement in real time, and of not requiring storing a significant data volume in a very short time.

Such a method enables, at the instant $t_{rec}$, the errors induced during navigation from the instant t=0 to the instant $t_{com}$ to be corrected by the drift of the MEMS gyroscope, and without requiring replay (that is recalculation) of navigation from the beginning with gyroscope measurements corrected by the bias value.

Resorting to MEMS and ASG gyroscopes allows a continuous operation over time, such gyroscopes being capable of providing a continuous measurement over time. This property makes possible the use of such gyroscopes in an inertial system. Indeed, specially for security reasons, a discontinuity over time in the rotation angle or rotational velocity measurements cannot be tolerated. The use of such gyroscopes is thus advantageous in comparison with the use, for example, of matter wave gyroscopes, which have the drawback of having a low passband and of providing discontinuous measurements over time.

Further, the low dimensions and production costs of ASG and MEMS gyroscopes make the inertial system 2 cheap.

The invention claimed is:

1. A navigational aid method for an inertial navigation system fixed with respect to a solid, the inertial system including at least one inertial sensor having a sensitive axis, each inertial sensor comprising an ASG gyroscope and a MEMS gyroscope integral with each other, the ASG gyroscope being able to deliver an ASG signal representative of a rotation about the corresponding sensitive axis, the MEMS gyroscope being able to deliver a MEMS signal representative of a rotation about the corresponding sensitive axis, the method including the steps of:

calculating, between a first date and a subsequent third date, a path and, for each inertial sensor, a corresponding biased path, from the MEMS signals, assuming, for the biased path, that the inertial sensor has a predetermined unit bias;

calculating, from the third date, the path and each biased path from the ASG signals, assuming, for the biased path, that the inertial sensor has a predetermined unit bias;

estimating a bias vector introduced by the MEMS gyroscopes, from the MEMS signals and ASG signals;

resetting, at a fourth date subsequent to the third date, the path as a function of each biased path, the unit biases and the estimated bias vector, to obtain a nominal path which is not affected by the bias of the MEMS gyroscopes.

2. The method according to claim 1, wherein, for each MEMS gyrometer, a corresponding component of the bias vector is equal to an average, between a second date and the fourth date, of a difference between an angular velocity from the corresponding MEMS signal and an angular velocity from the corresponding ASG signal, the second date being included between the first date and the third date.

3. The method according to claim 1, wherein the nominal path is obtained by subtracting a reset from the path, the reset being a vectorial corrective term calculated according to:

$$\delta Xn = b_{0x}\frac{\partial \widehat{Xn}}{\partial D0x} + b_{0y}\frac{\partial \widehat{Xn}}{\partial D0y} + b_{0z}\frac{\partial \widehat{Xn}}{\partial D0z}$$

where $\delta Xn$ is the reset;
$b_{0i}$ is the i-th component of the bias vector; and
the quantity $$\frac{\partial \widehat{Xn}}{\partial D0i}$$

is calculated according to:

$$\frac{\partial \widehat{Xn}}{\partial D0i} = \frac{XnDi(t_{rec}) - Xn(t_{rec})}{D0i}$$

where $XnDi(t_{rec})$ is the i-th biased path taken at the fourth date; and $D0i$ is the predetermined unit bias associated with the component i.

4. The method according to claim 1, comprising an overlap step, the overlap step including:

between the second date and the third date, the second date being included between the first date and the third date, a first phase for calculating the path and each biased path from the MEMS signal;

at the third date, a switching for calculating the path and each biased path from a corresponding angle increment, the angle increment being obtained, for each sensitive axis, by the relationship:

$$d\theta_{com} = \theta_{ASG}(t_{com}) - \theta_{MEMS}(t_{com} - T_e) - \Delta\theta$$

where $d\theta_{com}$ is the angle increment;

$\theta_{ASG}(t_{com})$ is a quantity equal to a cumulation of rotation angle increments about the sensitive axis between the second date and the third date, which are calculated from the ASG signal upon switching;

$\theta_{MEMS}(t_{com} - T_e)$ is a quantity equal to a cumulation of rotation angle increments about the sensitive axis between the second date and a duration $T_e$ before the third date, which are calculated from the MEMS signal;

each increment being equal to an integral, between two successive instants, of the angular velocity of a rotation about a sensitive axis from the corresponding MEMS or ASG signal, $\Delta\theta$ is a predetermined angular correction; and $T_e$ is a predetermined duration;

between the third date and the fourth date, a second phase for calculating the trajectory and each biased trajectory from the ASG signal.

5. The method according to claim 4, wherein the angular correction is equal to an average, between the second date and the third date, of values taken over time by a quantity $(\theta_{ASG} - \theta_{MEMS})$, where $\theta_{ASG}$ is a quantity equal, at a given instant, to a cumulation from the second date up to the given instant, of the rotation angle increments about the sensitive axis which are obtained from the ASG signal, for the inertial sensor considered, and $\theta_{MEMS}$ is a quantity equal, at a given instant, to a cumulation, from the second date up to the given instant, of the rotation angle increments about the sensitive axis, which are obtained from the MEMS signal.

6. The method according to claim 1, including, from the fourth date, calculating the nominal path only from the ASG signals.

7. A computer program product comprising program code instructions which, when executed by a computer, implement the navigational aid method according to claim 1.

8. An inertial navigation system fixed with respect to a solid, the inertial system including at least one inertial sensor having a sensitive axis, each inertial sensor comprising an ASG gyroscope and a MEMS gyroscope integral with each other, the ASG gyroscope being able to deliver an ASG signal representative of a rotation about the corresponding sensitive axis, the MEMS gyroscope being able to deliver a MEMS signal representative of a rotation about the corresponding sensitive axis, the inertial system further comprising a calculator configured to implement the navigational aid method according to claim 1.

* * * * *